US012384657B2

(12) United States Patent
Poon et al.

(10) Patent No.: US 12,384,657 B2
(45) Date of Patent: Aug. 12, 2025

(54) CONTACTLESS ELEVATOR CONTROL SYSTEM AND METHOD

(71) Applicant: Hong Kong Productivity Council, Kowloon (HK)

(72) Inventors: Lawrence Chi-Kin Poon, Kowloon (HK); Edmond Chung-Man Chan, Kowloon (HK); Cheuk-Ming Yip, Kowloon (HK)

(73) Assignee: Hong Kong Productivity Council, Kowloon (HK)

( * ) Notice: Subject to any disclaimer, the term of this patent is extended or adjusted under 35 U.S.C. 154(b) by 1220 days.

(21) Appl. No.: 17/173,615

(22) Filed: Feb. 11, 2021

(65) Prior Publication Data

US 2021/0371235 A1 Dec. 2, 2021

(30) Foreign Application Priority Data

Jun. 2, 2020 (HK) ........................... 32020008498.8

(51) Int. Cl.
*B66B 1/34* (2006.01)
*B66B 1/46* (2006.01)

(52) U.S. Cl.
CPC ............ *B66B 1/468* (2013.01); *B66B 1/3446* (2013.01); *B66B 2201/4638* (2013.01)

(58) Field of Classification Search
CPC .............................. B66B 1/468; B66B 1/3446
USPC ........................................................ 187/247
See application file for complete search history.

(56) References Cited

U.S. PATENT DOCUMENTS

| | | | | |
|---|---|---|---|---|
| 10,968,073 | B1 * | 4/2021 | Alnajjar | G08B 21/0476 |
| 2022/0324676 | A1 * | 10/2022 | Nikovski | B66B 1/3407 |
| 2023/0192441 | A1 * | 6/2023 | Wong | B66B 3/002 187/380 |

FOREIGN PATENT DOCUMENTS

| | | |
|---|---|---|
| CN | 201209077 | 3/2009 |
| CN | 201556190 | 8/2010 |
| CN | 204802795 | 11/2015 |
| CN | 205634507 | 10/2016 |
| KR | 200477281 | 5/2015 |

* cited by examiner

*Primary Examiner* — Erick D Glass
(74) *Attorney, Agent, or Firm* — JMB Davis Ben-David

(57) ABSTRACT

The present invention provides a contactless elevator control system and method. The system comprises an infrared touch sensor, a relay control device and an elevator button control device, wherein: the infrared touch sensor emits an array of multiple infrared beams, receives reflected infrared beams, calculates a vertical and lateral displacement, determines a corresponding coordinate information, calculates a corresponding elevator button, and sends a corresponding control; the relay control device drives the corresponding relay contacts to close. The solution uses the infrared touch sensor to achieve contactless control of elevator buttons, reducing the risk of spreading bacteria and viruses when touching the elevator buttons.

8 Claims, 2 Drawing Sheets

CONTACTLESS ELEVATOR CONTROL SYSTEM AND METHOD

CROSS-REFERENCE TO RELATED APPLICATIONS

Benefit is claimed to Hong Kong Patent Application No. 32020008498.8, filed Jun. 2, 2020, the contents of which are incorporated by reference herein in their entirety.

FIELD OF THE INVENTION

The present invention generally relates to the technical field of elevator control, and particularly to a contactless elevator control system and method.

BACKGROUND OF THE INVENTION

In some circumstances, people hesitate to touch the surface of the elevator button with greasy and dirty fingers. Vice versa, people also avoid to touch the elevator button which is contaminated. The report on the hygiene problem of frequent use of public surfaces has pointed out: the bacteria on the elevator buttons are much more than that on the surface of the hospital washroom. In a warm environment, less ventilated environment around at the elevator button area can facilitate bacteria growth. How to solve the hygiene problem of fingers touching elevator buttons, or choosing the corresponding elevator button without touching the elevator button, no effective solution has been proposed yet.

SUMMARY OF THE INVENTION

One object of the present invention is to provide a contactless elevator control system and method, solving the hygiene problem caused by the finger touching the elevator buttons in the prior art.

The present invention provides the contactless elevator control system, the system comprises: an infrared touch sensor, a relay control device and an elevator button control device, wherein the infrared touch sensor is installed adjacent to an elevator button panel and connected to the relay control device, the relay control device comprises a multiple relay contacts which are connected to each of button dry contacts, the button dry contacts are used to drive the elevator buttons;

- the infrared touch sensor is configured to: emit an array of multiple infrared beams, receive reflected infrared beams when an object enters the active detection area of the infrared touch sensor in front of the elevator button panel. It then calculates the vertical displacement and the lateral displacement according to the reflected infrared beams to determine the corresponding coordinate information, so as to perform mapping of corresponding elevator button number and send a corresponding control command to relay control device;
- the relay control device is configured to: drive the corresponding relay contact to close according to the corresponding control command; and
- the elevator button control device is configured to: actuate the corresponding button dry contact to close.

The present invention provides the contactless elevator control method, the method comprises:

- the infrared touch sensor emits an array of multiple infrared beams, receives multiple infrared beams when an object enters the active detection area of the sensor in front of the elevator button panel, calculates the vertical displacement and the lateral displacement according to the reflected infrared beams, so as to determine the corresponding coordinate information according to the vertical displacement and the lateral displacement and calculate the corresponding elevator button number according to the corresponding coordinate information, and send the corresponding control command according to the corresponding elevator button number;
- the relay control device drives the corresponding relay contacts to close according to the corresponding control command;
- the elevator button drive actuates the corresponding button dry contacts to close;
- wherein the infrared touch sensor is installed on the elevator button panel and connected to the relay control device, the relay control device includes a multiple relay contacts, connected to each of the button dry contacts, the button dry contacts used to actuate the elevator buttons.

In the embodiment of the present invention, the infrared touch sensor emits an array of multiple infrared beams, and receives the reflected infrared beams when an object enters the active detection area of the sensor in front of the elevator button panel, calculates the vertical displacement and the lateral displacement according to the reflected infrared beams, determines the corresponding coordinate information according to the vertical displacement and the lateral displacement, calculates the corresponding elevator button number according to the corresponding coordinate information, sends the corresponding control command according to the corresponding elevator button number, and controls the relay contacts in the relay control device based on the corresponding control command, thereby to actuate the button dry contacts of the elevator button control device connected with the relay contacts. There is no need for human fingers to touch the elevator buttons, which reduces the risk of spreading bacteria and viruses for better hygiene.

BRIEF DESCRIPTION OF THE DRAWINGS

In order to explain the embodiments of the present invention or the technical solutions in the prior art more clearly, the following briefly introduces the drawings that need to be used in the description of the embodiments.

DETAILED DESCRIPTION OF THE INVENTION

The technical solutions in the embodiments of the present invention are clearly and completely described below in conjunction with the accompanying drawings in the embodiments of the present invention. Obviously, the described embodiments are only a part of the embodiments of the present invention, not all the embodiments. Based on the embodiments of the present invention, all other embodiments obtained by those of ordinary skilled in the art shall fall within the protection scope of the present invention.

Figure 1:
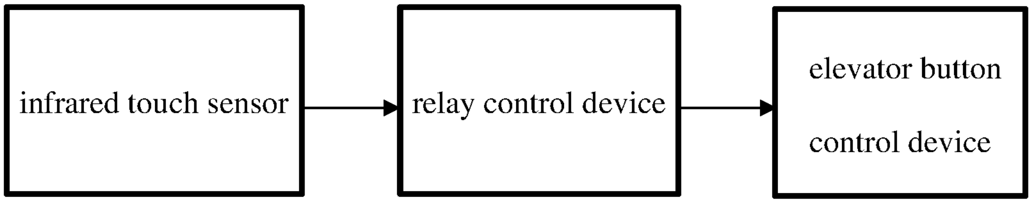
FIG. 1 is a structural block diagram of the contactless elevator control system according to the present invention.

The present invention provides a contactless elevator control system as shown in FIG. 1, the system includes:

an infrared touch sensor, a relay control device and an elevator button control device, wherein the infrared touch sensor is installed adjacent to an elevator button panel, and the infrared touch sensor is connected to the relay control device, the relay control device includes multiple relay contacts connected one by one with button dry contacts;

the infrared touch sensor is configured to: emit an array of multiple infrared beams, and receive infrared beams that are blocked and reflected when an object enters the active detection area of the infrared touch sensor in front of the elevator button panel, calculate a vertical displacement and a lateral displacement according to the reflected infrared beams, calculate a corresponding elevator button number according to the corresponding coordinate information, and send a corresponding control command;

the relay control device is configured to: drive the corresponding relay contacts to close according to the corresponding control command of the elevator button;

the elevator button control device is configured to: control the corresponding button dry contact to close, and select the elevator button number that the user needs to select.

A general-purposed proximity sensor usually emits infrared light to monitor for return light to detect close objects, and it is installed inside the elevator button control panel to directly emit infrared light from the inside to the outside in order to detect fingertips from users' inputs, however the dynamic variation of ambient light may also interfere with the receiver, and each button is needed to be embedded with proximity sensors, causing complication during installation. Other sensors, such as Light detecting and ranging (LiDAR) and Time-of-Flight (ToF), are effective for obstacle detection, but they are costly due to system complexity.

The present invention proposes to use the infrared touch sensor. By using reflective technology, infrared touchless sensing can be achieved by installing one or more infrared touch sensors adjacent to the elevator control panel. The interactive touch area consists of an array of multiple infrared beams, projected and positioned at the required distance above the surface of the elevator control panel.

Figure 2:
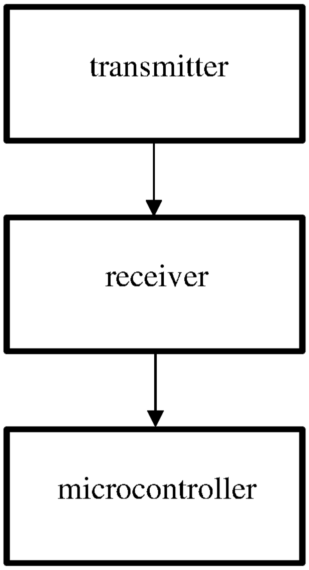
FIG. 2 is a structural block diagram of the infrared touch sensor according to the present invention.

FIG. 2 is a structural block diagram of the infrared touch sensor provided by an embodiment of the present invention. As shown in FIG. 2, the infrared touch sensor includes a transmitter, a receiver, and a microcontroller;

the transmitter is configured to: emit infrared beams;

the receiver is configured to: receive the infrared beams that is blocked and reflected when an object enters the active detection area of the sensor in front of the elevator button panel;

the microcontroller is configured to: calculate the vertical displacement and the lateral displacement according to the reflected infrared beams, determine the corresponding coordinate information according to the vertical displacement and the lateral displacement, calculate the corresponding elevator button number according to the corresponding coordinate information, and send the corresponding control command according to the corresponding elevator button number. The microcontroller reads the object coordinates and converts them into button commands, and then drives the corresponding relay to close through the communication bus.

Wherein the infrared touch sensor may include an array of multiple transmitters and receivers, arranged in alternate manner. During the scan, each transmitter is continuously scanned while a plurality of receiver signals is simultaneously recorded, and each transmitter-receiver combination covers a narrow area on the active area. Objects presented in the active area affect a plurality of transmitter-receiver channels, and the reported coordinates are the result of the trigonometric calculation of these signals.

Compared with an infrared proximity detector that relies on signal strength to locate objects, the geometry of the infrared touch sensor has turned object positioning into a geometric problem.

The infrared touch sensor has the ability to simultaneously detect and track multiple objects. The hardware and software have been optimized, and software filtering is performed to ignore unnecessary false triggers other than finger-sized objects.

In addition, the infrared touch sensor also needs to be calibrated to reduce the error in determining the coordinates.

In the embodiment of the present invention, the microcontroller in the infrared touch sensor interprets the valid key events and outputs them to Modbus RTU RS-485 interface. The relay control device receives commands through its Modbus RTU RS-485 interface.

RS-485 is a physical interface, in simple terms, it is hardware. RS-485 belongs to wired transmission, so hardware transmission media is required. In fact, just two wires are enough. The two wires are actually transmitting the same signal, the transmitting end divides the signal into two, and the receiving end restores them to the original signal.

Modbus is an international standard communication protocol used to exchange data between devices of different manufacturers (usually for industrial purposes). The Modbus protocol is divided into Modbus RTU. The physical hardware interfaces used are all serial communication ports.

The infrared touch sensor can be widely used in almost all existing elevator control panels with various button layouts. Since the infrared touch sensor projects an array of multiple beams for finger detection, it is not limited to work in existing control panels. In other words, the sensor can be installed in the elevator in any location without a physical button panel and can be installed on a flat surface to become a virtual control panel.

The infrared touch sensor has the characteristics of high scanning frequency and high detection rate, and high touch accuracy.

In the embodiment of the present invention, the relay control device can be installed around the elevator button panel, or on the top of an elevator car, or anywhere in the elevator car. The relay control device includes a plurality of relays. The plurality of relay contacts is connected to the button dry contacts in the elevator button control device one by one. The button dry contacts are used to drive the elevator buttons. The elevator button control device is existed in the original elevator and may include a user button control panel and an elevator main control unit. The elevator control panel includes floor and door control buttons for user commands. When contacts of the corresponding relay are closed, the output is directly driven to the button dry contacts. Similar to the original buttons, at the end of the trigger, the dry contacts are opened and the active logic level activates the button event of the original elevator controller, but all floor call events are latched in the elevator main control unit until the designated floor is reached.

The dry contact is a passive switch, which has two states of closed and open. There is no polarity between two dry contacts and can be interchanged.

Based on the same inventive concept, an embodiment of the present invention also provides a contactless elevator control method as described in the following embodiments.

Since the problem-solving concept of the contactless elevator control method is similar to that of the contactless elevator control system, the implementation of the contactless elevator control method can refer to the implementation of the contactless elevator control system, and the repetition is be repeated.

Figure 3:
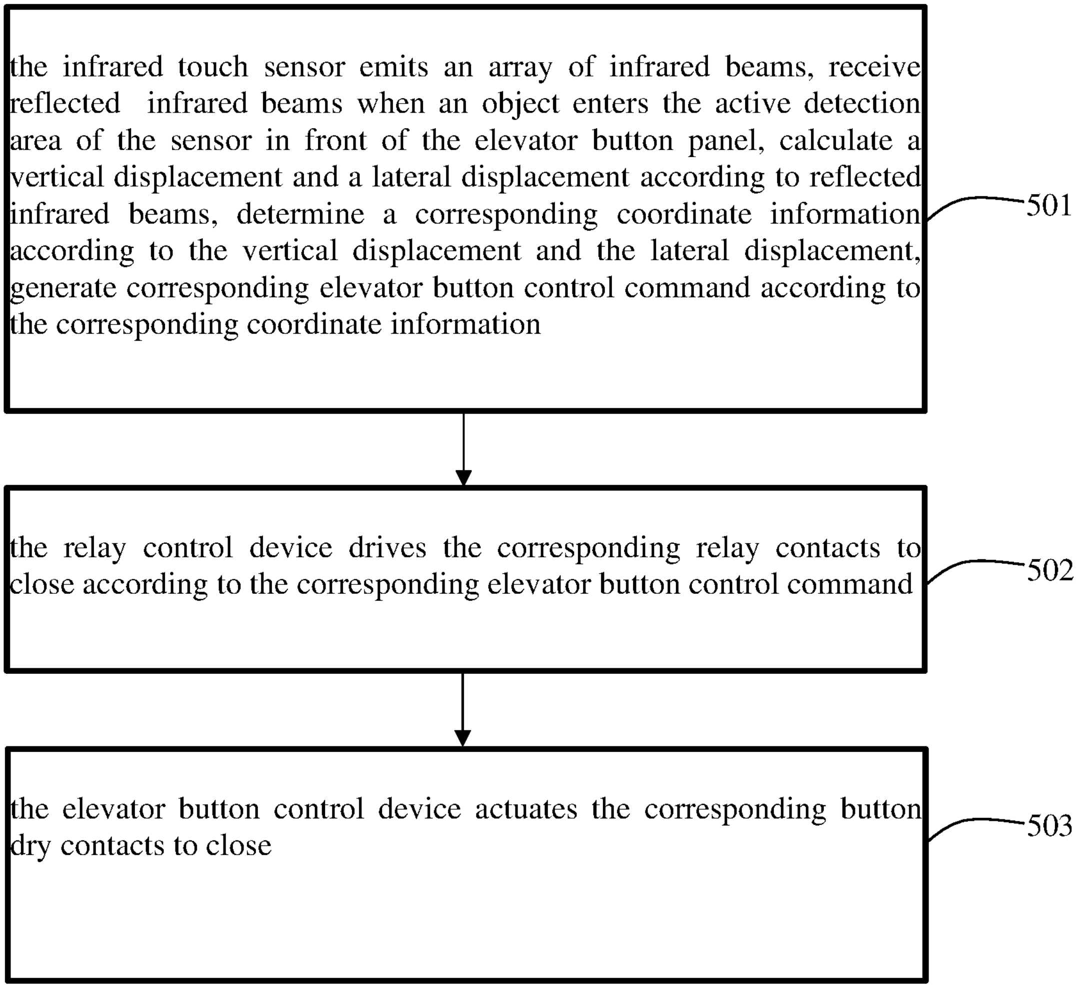
FIG. 3 is a flow chart of the contactless elevator control method according to the present invention.

FIG. 3 is a flow chart of the contactless elevator control method according to an embodiment of the present invention. As shown in FIG. 3, the method includes:

Step 501: the infrared touch sensor emits the infrared beam, receive the reflected infrared beam when an object enters the active detection area of the sensor in front of the elevator button panel, calculate the vertical displacement and the lateral displacement according to the infrared beam information, determine the corresponding coordinate information according to the vertical displacement and the lateral displacement, calculate the corresponding elevator button number according to the corresponding coordinate information, and send the corresponding control command according to the corresponding elevator button number;

Step 502: the relay control device drives the corresponding relay contacts to close according to the corresponding control command, Step 503: the elevator button control device actuates the corresponding button dry contacts to close, and selects the elevator button number that the user needs to select;

wherein the infrared touch sensor is installed on the elevator button panel and connected to the relay control device, the relay control device includes a plurality of relay contacts and the plurality of relay contacts are connected to the button dry contacts of the elevator button control device one by one, and the button dry contacts are used to drive elevator buttons.

In the embodiment of the present invention, the infrared touch sensor includes a plurality of transmitters and a plurality of receivers, the transmitters and receivers are alternately arranged.

In the embodiment of the present invention, the infrared touch sensor is connected to the relay control device through the Modbus RTU RS-485 interface on the microcontroller.

In summary, the contactless elevator control system and method proposed by the present invention have the following advantages:

users no longer need to press on elevator buttons, all they have to do is to hover fingers over the infrared touch sensor that receive the reflected infrared beams when a finger enters to its active detection area of the sensor in front of the elevator button panel. The system is then to calculate the vertical displacement and the lateral displacement according to the infrared beam information, determine the corresponding coordinate information according to the vertical displacement and the lateral displacement, calculate the corresponding elevator button number according to the corresponding coordinate information, and send the corresponding control command according to the corresponding elevator button number, and control the relay contact in the relay control device to drive the button dry contacts of the elevator button control device connected with the relay contacts. There is no need for human fingers to touch the elevator buttons, which reduces the risk of spreading bacteria and viruses when touching the elevator buttons and ensures better hygiene.

Those skilled in the art should understand that the embodiments of the present invention can be provided as method, system, or computer program product. Therefore, the present invention may adopt the form of a complete hardware embodiment, a complete software embodiment, or an embodiment combining software and hardware. Moreover, the present invention may adopt the form of a computer program product implemented on one or more computer-usable storage media (including but not limited to disk storage, CD-ROM, optical storage, etc.) containing computer-usable program codes.

The present invention is described with reference to flow diagrams and/or block diagrams of method, device (system), and computer program product according to embodiments of the present invention. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment to generate a device for implementing the functions specified in one process or multiple processes in the flowchart and/or one block or multiple blocks in the block diagram.

These computer program instructions can also be stored in a computer-readable memory that can guide a computer or other programmable data processing equipment to work in a specific manner, so that the instructions stored in the computer-readable memory produce a manufacture including an instruction device, and the instruction device realizes the functions specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, so that the instructions executed on the computer or other programmable devices provide steps for implementing the functions specified in the flow or multiple flows in the flowchart and/or the block or multiple blocks in the block diagram.

The foregoing descriptions are only preferred embodiments of the present invention and are not intended to limit the present invention. For those skilled in the art, the embodiments of the present invention may have various modifications and changes. Any modification, equivalent replacement, improvement, etc., made within the principle of the present invention shall be included in the protection scope of the present invention.

What is claimed is:

1. A contactless elevator control system comprises an elevator button control device with button dry contacts, the button dry contacts are configured to drive elevator buttons, it is characterized in that the system further comprises: an infrared touch sensor and a relay control device, wherein the infrared touch sensor is installed adjacent to an elevator button panel and connected to the relay control device through a Modbus RTU RS-485 interface, the relay control device comprises a plurality of relay contacts and the plurality of relay contacts are connected to the button dry contacts of the elevator button control device one by one;

the infrared touch sensor is configured to: emit an array of infrared beams, receive reflected infrared beams when an object enters the active detection area of the infrared touch sensor in front of the elevator button panel, calculate a vertical displacement and a lateral displacement according to the reflected infrared beams, determine a corresponding coordinate information according to the vertical displacement and the lateral displacement, calculate a corresponding elevator button number according to the corresponding coordinate information, and send a corresponding control command according to the corresponding elevator button number;

the relay control device is configured to: drive the corresponding relay contacts to close according to the corresponding control command; and the elevator button control device is configured to: drive the corresponding button dry contacts to close.

2. The contactless elevator control system of claim 1, wherein the infrared touch sensor includes a transmitter, a receiver and a microcontroller;

the transmitter is configured to: emit the infrared beam;

the receiver is configured to: receive the reflected infrared beams when an object enters the active detection area of the sensor in front of the elevator button panel;

the microcontroller is configured to: calculate the vertical displacement and lateral displacement according to the infrared beam information, determine the corresponding coordinate information according to the vertical displacement and the lateral displacement, calculate the corresponding elevator button number according to the corresponding coordinate information, and send the corresponding control command according to the corresponding elevator button number.

3. The contactless elevator control system of claim 2, wherein the infrared touch sensor includes a plurality of transmitters and receivers, and the plurality of transmitters and receivers are alternately arranged.

4. The contactless elevator control system of claim 2, wherein the transmitter emits the infrared beam perpendicular to an output window.

5. The contactless elevator control system of claim 2, wherein the view field of the receiver is centered on the left and right preset angles.

6. The contactless elevator control system of claim 1, wherein the relay control device is installed around the elevator button panel or on the top of an elevator car.

7. A contactless elevator control method, wherein an elevator button control device contains button dry contacts, and the button dry contacts are configured to control elevator buttons, it is characterized in that the method includes:

the infrared touch sensor emits an array of infrared beams, receive reflected infrared beams when an object enters the active detection area of the sensor in front of the elevator button panel, calculate a vertical displacement and a lateral displacement according to the infrared beam, determine a corresponding coordinate information according to the vertical displacement and the lateral displacement, calculate a corresponding elevator button number, and send a corresponding control command;

the relay control device drives the corresponding relay contacts to close according to the corresponding control command;

the elevator button control device controls the corresponding button dry contacts to open;

wherein the infrared touch sensor is installed adjacent to the elevator button panel and connected to the relay control device through a Modbus RTU RS-485 interface, the relay control device includes a plurality of relay contacts, the plurality of relay contacts are connected to the button dry contacts of the elevator button control device one by one.

8. The contactless elevator control system of claim 7, wherein the infrared touch sensor includes a plurality of transmitters and receivers, and the plurality of transmitters and receivers are alternately arranged.

* * * * *